Figure 1:
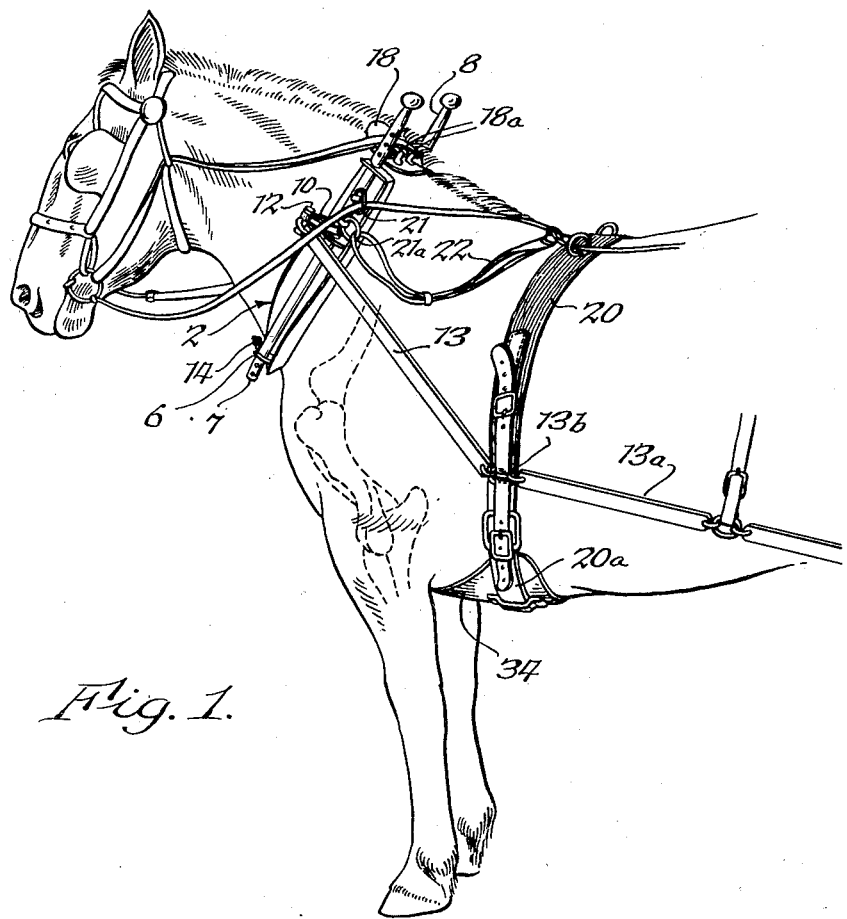

March 14, 1950 J. E. KOHLER 2,500,187
HARNESS FOR DRAFT ANIMALS

Filed Jan. 9, 1946 4 Sheets-Sheet 1

INVENTOR
Johan Eli Kohler
BY
C. A. Norton
ATTORNEY

March 14, 1950 J. E. KOHLER 2,500,187
HARNESS FOR DRAFT ANIMALS
Filed Jan. 9, 1946 4 Sheets-Sheet 3
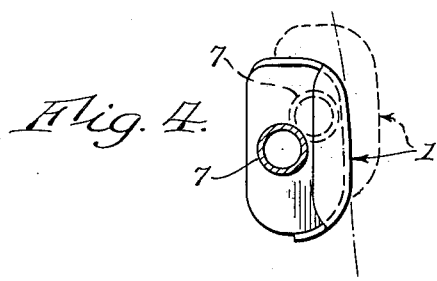
Fig. 4.
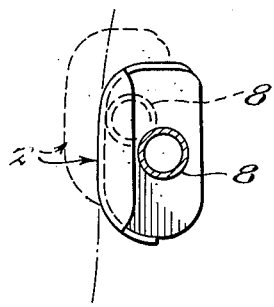
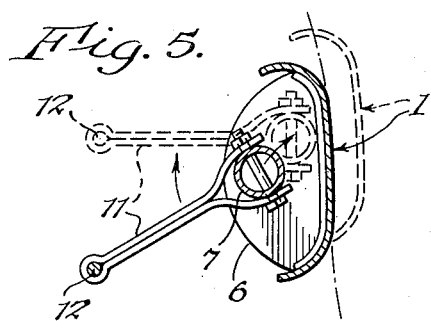
Fig. 5.
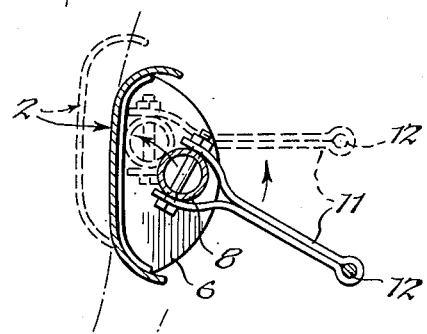
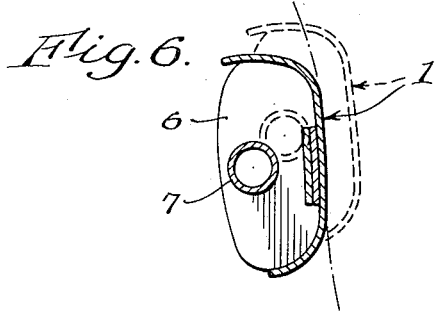
Fig. 6.
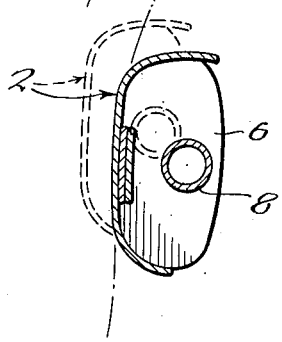
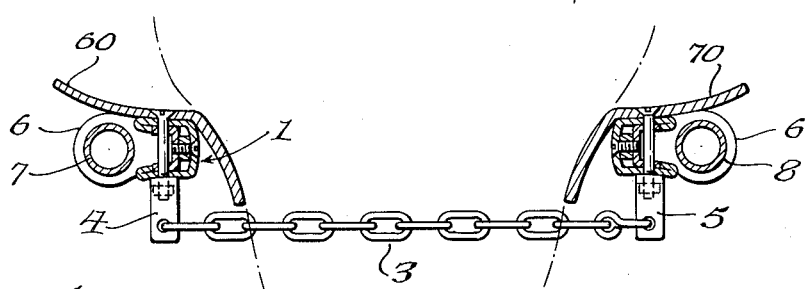
Fig. 7.
INVENTOR
Johan Eli Kohler
BY
ATTORNEY March 14, 1950 — J. E. KOHLER — 2,500,187
HARNESS FOR DRAFT ANIMALS
Filed Jan. 9, 1946 — 4 Sheets-Sheet 4

INVENTOR
Johan Eli Kohler
BY C. A. Norton
ATTORNEY

Patented Mar. 14, 1950

2,500,187

UNITED STATES PATENT OFFICE 2,500,187

HARNESS FOR DRAFT ANIMALS

Johan Cato Eli Kohler, Buffalo, N. Y.

Application January 9, 1946, Serial No. 640,003

4 Claims. (Cl. 54—18)

This invention relates to improvements in harness, and more particularly harness for draft horses, mules, and other draft animals.

In the common harness, the power of the animal is applied through a collar, and thence through traces or tugs to the load. The collar is shaped to hang around the animal's neck, and when the animal is standing still, the collar rests with its weight practically entirely carried on the top of the neck.

When the animal begins to work, stepping forward, lifting one front leg, knee, and shoulder blade, it pushes the collar with one shoulder while the other shoulder tends to move out of contact with the collar. When the animal takes the next step forward with the opposite front leg, a similar action takes place, but this time on the opposite side.

As the animal continues to step forward, first one shoulder and then the other rubs against the collar, applying pressure alternately to right and left shoulders, in a sort of seesaw action, which applies the strain to the animal's body in a skew way to his backbone, causing loss of part of his potential power. The large shoulder bones near the skin, unprotected by deep cushions of muscles, rub the skin against the collar, producing friction, chafing, galling, sore and sweeny shoulders, sore necks, and fistulas.

Even if sores are not produced, this anatomically improper application of forces tends to throw the animal off balance, interfering with the free action of the shoulders and producing a disinclination to work, because it cannot exert its force freely and in the most efficient manner.

If the animal is worked to the point where swellings and sores develop, it is necessary for it to be laid up until healed, and this may take several weeks, involving cost of maintenance, medicine, and special care.

All of this decreases the amount of work which the animal should, and otherwise would, be able to do easily if the load were applied in the proper manner. In most cases, it is not only the tiring of the animal which limits the amount of work which it can perform, but the irritation and pain produced by the concentration of weight and pressure in relatively small areas, aggravated by sweating and friction.

The collar heretofore used has to be large enough so that it extends three to four inches below the animal's windpipe, and wide enough so that it does not touch the jugular vein, thus permitting free blood circulation. To determine whether the collar is large enough, the driver should be able to put his hand freely between the side of the animal's neck and the inside of the collar.

Other difficulties of the common harness heretofore used may be noted. The side draft of the neck yoke steering the pole comes mainly on top of the neck because the yoke carrying the pole is hooked to both sides of the collar by the breast strap, applying additional weight to the top of the neck. The hames customarily employed are shaped like the collar and fit tightly to it, making it very rigid. Usually, and according to best practice, the collar is fitted to the horse, each horse having its own, but even so, the design and construction of conventional collars and hames prevent an efficient fit. The result is the concentration of pressure on small areas, resulting in sores, etc.

In breaking in the horse to the common draft harness of the type heretofore employed, oftentimes many days are needed to allow the horse to become accustomed to the harness, and working must be done very gradually; otherwise the horse may be spoiled for harness work by injuring the shoulders.

In accordance with my invention, I provide a harness in which these and other difficulties are greatly reduced, if not entirely eliminated. In the harness according to my invention there are no areas subject to heavy pressure, and both the weight of the harness and the load pressure are distributed over a relatively large area of the animal's body, whereby severe contact pressure on any small areas is eliminated, and actual pressure at any point is reduced to a low level, even when the animal is pulling hard.

Moreover, these pressure areas do not occur over any point or surfaces where bones are moving underneath and close to the skin, but occur over deep, resilient muscular cushions, and these pressures are applied only when the animal is actually pulling the load. At other times pressure is reduced to a minimum.

With the harness according to my invention, the seesawing action and skew application of force, characteristic of the common harness, are eliminated. The load of the pull is at all times applied symmetrically and uniformly on both sides of the animal's backbone, permitting full and free action of the animal's shoulders, and introducing no tendency to throw him to one side or the other or to put him off balance.

The result of all this is that, when working in a harness according to my invention, the animal actually can do considerably more work with less distress and fatigue, and with practically complete elimination of the possibility of developing swellings, pain, and sores.

A smaller and lighter animal wearing my harness, harnessed double with a stronger and heavier animal wearing the common harness, will actually outpull the stronger animal during the working period and will be fresher at the end, as many tests have proved. Also, an animal with unhealed sores resulting from working in a common harness will work willingly in my harness, without any discomfort or injury to the sores, since my harness does not touch the sore areas at any time.

From the foregoing, it will be seen that it is an object of my invention to provide a harness in which the animal can work at full efficiency, exerting the maximum effort of which its body is capable, without being hampered by pressures (and pain) applied at spots which would cause unbalance, unnecessary strain, and actual injury to the animal.

It is a further object of my invention to provide a harness which will permit the animal to have better footing and balance on slippery roads and will give it more traction and free action, without chafing or galling, with more power and more control over the side-swinging motion of the pole.

It is a further object of this invention to provide a harness in which the pressure of forward or backward effort developed between the animal and the harness is distributed over a large area, whereby the pressure at any one point or any small area is reduced to a minimum, preventing the development of sores or discomfort.

It is a further object of this invention to provide a harness in which the working pressure between the animal and the harness is applied over areas of the animal's body where there are deep and solid cushions of resilient muscles, avoiding any areas where bones are immediately underneath the skin.

It is a further object of this invention to provide a harness of the class described in which the pressure between the harness and the animal, when pulling, is reduced to a minimum and in which, through the purely automatic action of the harness itself, it is only a little increased when the animal pulls, and never to a point sufficient to cause discomfort or to interfere with the pulling effort.

Still other objects and advantages of my invention will be apparent from the specification.

Figure 9:
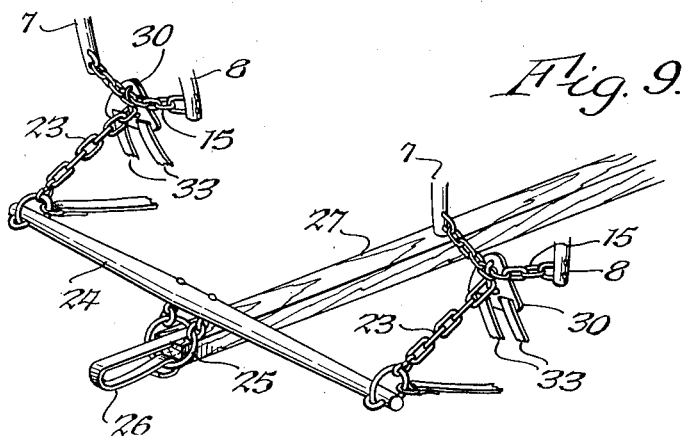
Figure 10:
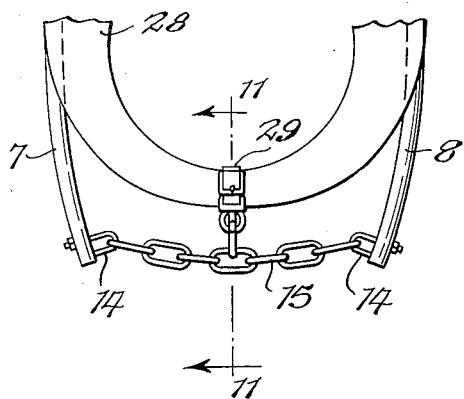
Figure 11:
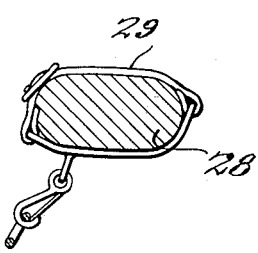

The features of novelty which I believe to be characteristic of my invention are set forth with particularity in the appended claims. My invention itself, however, both as to its fundamental principles and as to its particular embodiments, will best be understood by reference to the specification and accompanying drawing, in which Fig. 1 is a side view of a horse wearing a harness in accordance with my inveniton, Fig. 2 is a sectional view on lines 2—2 of Fig. 3 showing the action of the rotary hames in accordance with my invention, Fig. 3 is a front elevation of the neck pads and hames in position on a horse's neck, the right-hand neck pad (as the drawing is viewed) and fittings being shown partly in section, Figs. 4, 5, 6, 7, and 8 are sectional views on lines 4—4, 5—5, 6—6, 7—7, and 8—8 of Fig. 3 respectively, Fig. 9 is a fragmentary perspective view showing the action of my harness which occurs when the horse backs, Fig. 10 is a fragmentary view showing the use of rotary hames according to my invention, with the common collar, and Fig. 11 is a section on lines 11 of Fig. 10.

Figure 2:
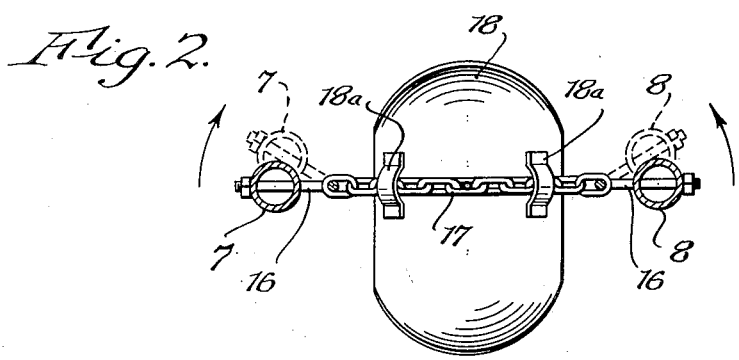
Figure 3:
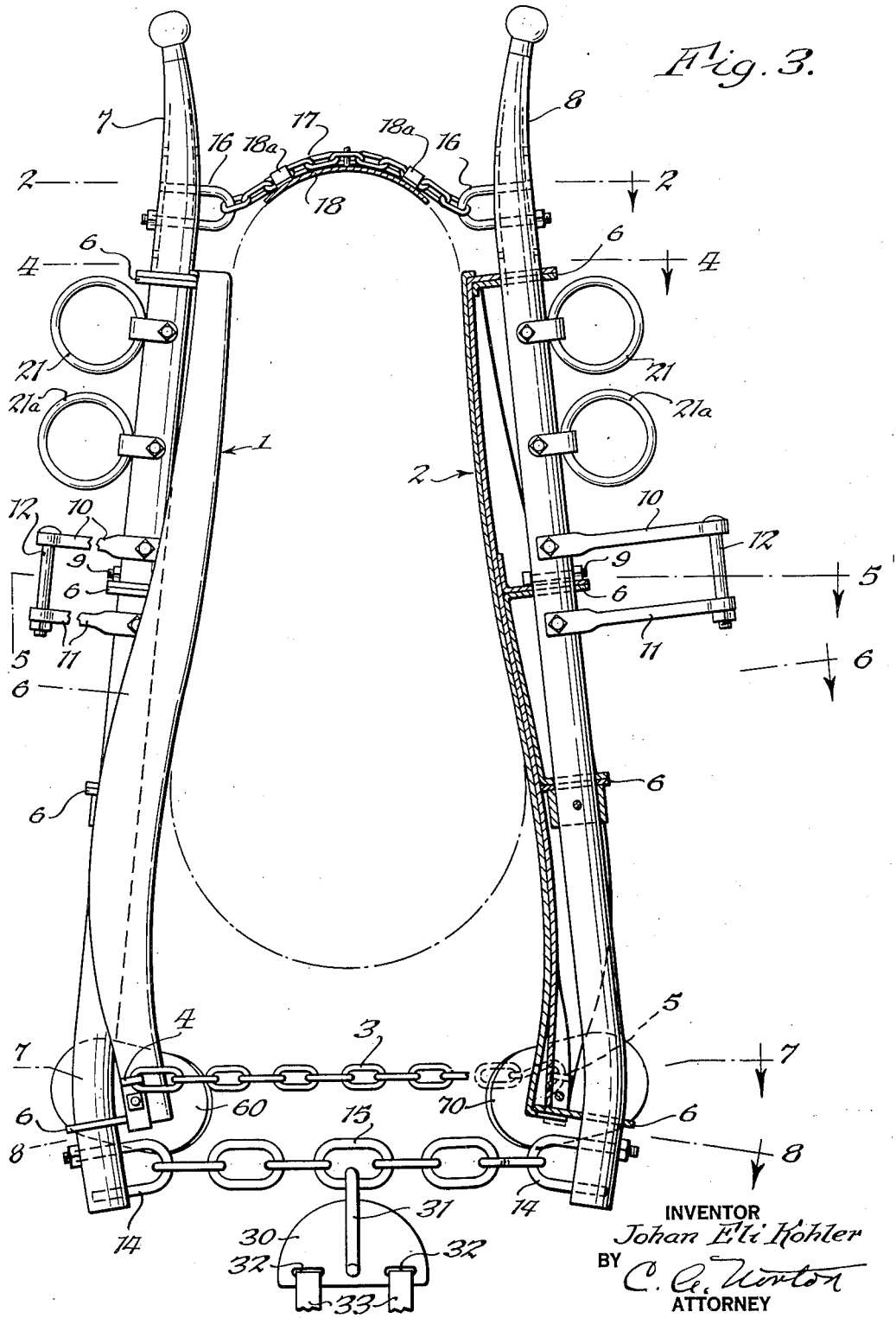
Figure 8:
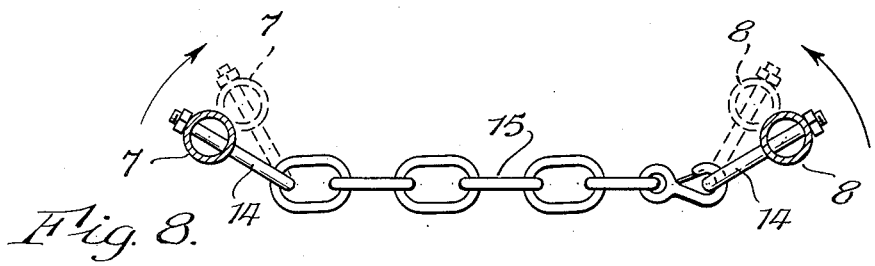

Referring now more particularly to Figs. 1 and 3, instead of a conventional collar, I prefer to use a pair of neck pads 1 and 2, shaped to fit the sides of the horse's neck, 3 to 4 inches forward of the shoulders. These may be formed of metal stampings, molded plastic, wood, or any other suitable material, preferably without surface padding, but generally shaped to conform to the sides of the animal's neck, and having rounded contours and no sharp edges, in order to avoid danger of cutting or chafing. If these pads are made of sheet metal or the like, the edges may be bent or flanged as shown in Figs. 4–6 inclusive.

These neck pads, right and left respectively, may be 4 inches or more in width from front to back over most of their length, tapered at lower end, and long enough to reach from near the top of the animal's neck to a few inches below it, and may be connected together at their bottom ends by a chain or strap 3, passing through holes in brackets 4 and 5 mounted at the lower ends of pads 1 and 2.

The contact area of each neck pad with the neck, being approximately 4 inches wide and 20 inches long, provides a contact area on each side of approximately 80 square inches. As indicated in Fig. 3, these neck pads will generally have the shape, longitudinally, of a very shallow letter S or integral sign. Leather pads 60 and 70, called "safers," may be secured adjacent the bottom end of each neck pad to protect against rubbing or chafing. Breast pad 30 may be secured by snap link 31 to chain 15, and may have slots 32 to receive straps 33 passing between the front legs on both sides of the sternum from the front end of chest pad 34.

At various points on each neck pad there may be provided outwardly-extending ears 6 or bearings, secured to the neck pads, provided with openings, and mounted in these openings I may provide rotary hames 7 and 8 supported by bolts 9, secured to hames 7 and 8, which rest upon ears 6 and prevent the hames from dropping when inserted in the ears on the neck pads, but permit partial rotation of the hames in the neck pads.

When in position on the animal's neck, the top ends of the hames may be flexibly but inelastically connected by chain or strap 17 connected to inwardly projecting U-bolts or pressure exerting arms 16 carried by the upper ends of hames 7 and 8, and chain or strap 17 preferably passes through loops 18a on top neck pad 18, preventing chafing of the neck by chain or strap 17. The lower end of each of the hames 7 and 8 is provided with an inwardly extending U-bolt or pressure exerting arms 14, and these are flexibly but inelastically connected together by chain or strap 15.

Adjustment for different size animals may be made by providing a series of holes for bolts or arms 16 at different points, as shown in Fig. 3, and of course the various chains or straps may be provided with snap links or buckles so they may be shortened or lengthened.

Secured to each of the hames is a pair of hame draft arms, in the form of brackets 10 and 11, joined at their outer extremities by bolt 12, to which the forward end of traces or tugs 13 may be pivotally connected. Hames 7 and 8 may be formed of wood or metal tubing or the like. The top neck pad 18 is preferably of one piece of relatively stiff material and is flexibly carried on the chain 17 by means of the chain receiving loops 18a.

As will be observed, in applying the neck pad and hame assembly to the animal, it is placed about 4 inches forward of the horse's shoulder, as indicated in Fig. 1, or approximately a hand's breadth forward of the shoulder bones shown in dotted lines. In this position, the pad rests on a deep cushion of resilient muscles and is well forward from any moving bones immediately under the surface of the skin, and the muscles against which it rests are not ordinarily moving when the horse is pulling or backing. Because of the fact that the animal's neck is thicker and wider at the lower part than above, the weight of the neck pads is carried to a considerable extent by the areas of the neck with which they are in contact and only a small part of the weight is carried by top neck pad 18.

Tugs or traces 13 are attached at their forward end to hame draft extension bolts 12 on each side, and these traces in turn connect to additional traces 13a through suitable links 13b carried by bellyband 20a attached to back pad 20.

Top rings or loops 21 may be pivotally attached to hames 7 and 8, through which the reins or lines may be passed, and lower rings 21a may be provided, to which hame straps 22 may be connected. When used in double harness, the chains 15 of each harness may be connected to opposite ends of neck yoke 24 (Fig. 9) by means of breast chains and snap 23 or the like, the neck yoke being connected to ring 25 which surrounds tongue 26 on pole 27. The function of this connection is to provide for operation when the animals are backing and steering, as will be described hereafter.

Operation of the harness will best be understood by reference to Figs. 3 and 6, and will now be described. Assuming the animal to be harnessed and attached to a load such as a wagon or plow, the hames will have the position shown in full lines in Fig. 5; that is, hame draft extensions 10 and 11 will point slightly toward the animal's head, making an angle of approximately 60° with the line of its backbone.

When the animal steps forward, tension develops in traces 13 attached to the load, and the pull of the traces on hame draft extension bolts 12 causes the hames to rotate as indicated by the arrows in Fig. 5, to a position where the hame draft extensions are approximately perpendicular to the line of the animal's backbone, as shown in dotted lines in Fig. 5.

Because the lower ends of the hames are fastened together by chain 15 and their upper ends are fastened together by chain 17, this rotary motion of the hames produces a lateral motion also; that is, hame 7 swings on a pivot formed by the inner extremity of bolts or arms 16 and 14, and moves inward and rearwardly toward the animal's neck, as shown by dotted lines in Figs. 4, 5, and 6.

Similarly, hame 8 swings between a pivot formed by the inner part of its bolts or arms 16 and 14 and likewise moves rearwardly and inward the animal's neck.

Since pads 1 and 2 are freely rotatable on hames 7 and 8, the pads remain in contact with the animal's neck in the same relative position as before, the hames rotating within the pads, and the pads are pressed lightly but firmly against the animal's neck, evenly throughout their length. This motion should in any event be sufficient to hold the neck pads firmly in position against the pull of traces 13, but should, of course, not be so large as to produce any choking, pinching, distress, or discomfort to the animal. A decrease of separation of the pads by about an inch is usually most satisfactory.

In actual use, I have found that the actual working contact pressure is so low that one may insert his hand between the animal's neck and the neck pad at any point, and walk alongside the animal while it is pulling its load, without any discomfort.

The action of the harness when the animal backs is illustrated in Fig. 9. In this instance, as each animal steps backward, breast chains 23 are tightened and doubletree 24 is pulled to its farthest rear position. This in turn causes a pull on chains 15, causing the neck pads to move inwardly and cling to the sides of the neck without allowing the hames to rotate. This action does not occur, however, when a single horse is harnessed to a load because with such an arrangement neck yoke 24 on pole 27 would not be used, and under such conditions the usual, or hip breeching strap (not shown) will be provided to take care of backing.

While I prefer to dispense with the common collar and to use the harness with the neck pads resting directly against the neck of the animal, as already described, nevertheless, the principle may be adapted to the use of the common collar, as indicated in Fig. 10, wherein 28 indicates the collar provided with hames 7 and 8 fitted in the usual groove provided for common hames.

In this case, strap 29 with a clip may be provided, encircling the bottom of the collar and connecting to chain 15 to hold hames 7 and 8 in the groove. The contracting principle is employed in precisely the same manner as before, the rotation of hames 7 and 8, when held at top and bottom by chains 17 and 15, causing them to move toward each other, thereby pressing the collar into engagement with the animal's neck. This arrangement, while nearly as good as the neck pads already described, is an improvement over the common collar with fixed hames.

In the specification I have explained the principles of my invention and the best mode in which I have contemplated applying those principles, so as to distinguish my invention from other inventions; and I have particularly pointed out and distinctly claimed the part, improvement, or combination which I claim as my invention or discovery.

While I have shown and described certain preferred embodiments of my invention, it will be understood that modifications and changes may be made without departing from the spirit and scope thereof, as will be clear to those skilled in the art.

I claim:

1. In a harness for draft animals, in combination, a collar having a peripherally-extending hame-receiving groove, a pair of hames mounted thereon for partial rotation therewith, means for securing said hames in said groove while permitting rotation thereof, flexible connections at top and bottom of said hames so arranged that rotation thereof relative to said collar produces inward movement thereof upon the neck muscles of the animal, and draft extensions projecting outwardly from said hames for connection to the respective harness traces.

2. In a harness for draft animals, in combination, a collar having a peripherally-extending hame-receiving groove, a pair of hames mounted thereon for partial rotation therewith, means for securing said hames in said groove while permitting rotation thereof, separate flexible means connecting the tops and the bottoms of said hames, whereby rotation thereof relative to said collar produces inward movement thereof upon the neck muscles of the animal, a relatively stiff top neck pad pivotally secured to the flexible means at the tops of said hames, and draft extensions projecting outwardly from said hames for connection to the respective harness traces.

3. In a harness for draft animals, in combination, a pair of neck pads fitting against and conforming to opposite sides of the neck of the animal for pressing inwardly on the neck muscles at positions located forwardly of the shoulder bones of the animal, a hame journaled on each neck pad to turn thereon and having fixed supporting arms at top and bottom thereof, upper and lower tension members joining the arms and thereby securing said hames together at top and bottom, and an outwardly extending draft arm fixed on each hame for connection to the respective trace, each hame with its upper and lower supporting arms and its draft arm constituting a rigid rocker unit pivoting about points of fulcrum support on the upper and lower tension members to swing the pad bodily and forwardly against the neck of the animal.

4. In a harness for draft animals, in combination, a pair of neck pads fitting against and conforming to opposite sides of the neck of the animal for pressing inwardly on the neck muscles at positions located forwardly of the shoulder bones of the animal, each pad being provided with a number of aligned bearings at spaced positions thereon, a hame pivotally mounted in the bearings of the associated pad, fixed supporting arms at the top and bottom of each hame, upper and lower tension members joining the supporting arms and thereby securing the hames together at the top and bottom in pivotal manner, and an outwardly extending draft arm fixed on each hame for connection to one of the traces of the harness, whereby when said hame is rotated within its associated pad, the hame and pad will be moved as a unit against the neck of the animal.

JOHAN CATO ELI KOHLER.

REFERENCES CITED

The following references are of record in the file of this patent:

UNITED STATES PATENTS

| Number | Name | Date |
|---|---|---|
| 98,311 | Smith | Dec. 28, 1869 |
| 231,664 | Guernsey | Aug. 31, 1880 |
| 312,081 | Brownson | Feb. 10, 1885 |
| 729,742 | Du Bois | June 2, 1903 |
| 969,837 | Brown | Sept. 13, 1910 |
| 1,561,360 | Schreimer | Nov. 10, 1925 |
| 2,302,947 | Kohler | Nov. 24, 1942 |

FOREIGN PATENTS

| Number | Country | Date |
|---|---|---|
| 20,057 | Sweden | Sept. 20, 1904 |